J. HANNA.
MACHINE FOR TURNING AND JOINING SHEETS OF RUBBER AND THE LIKE.
APPLICATION FILED DEC. 10, 1915.
1,289,744.
Patented Dec. 31, 1918.
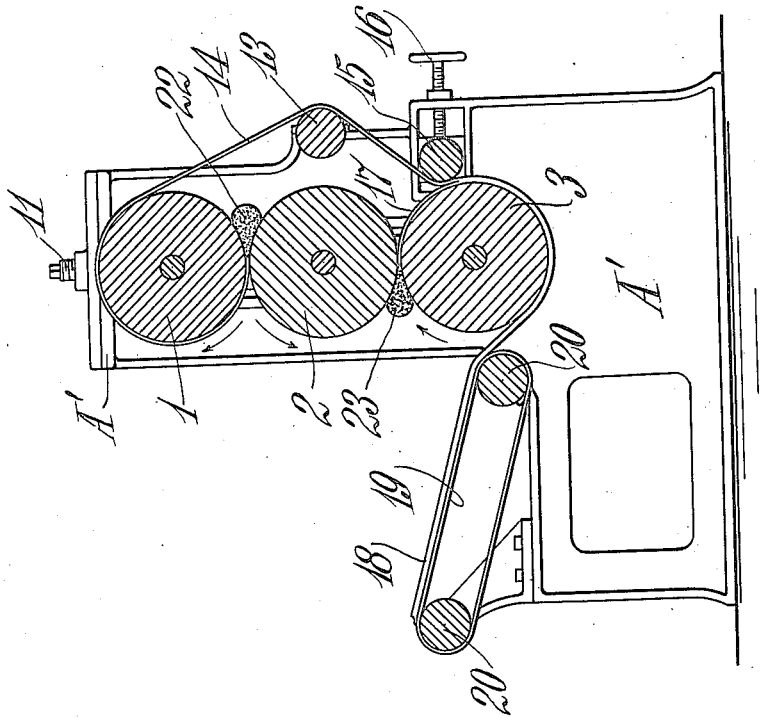
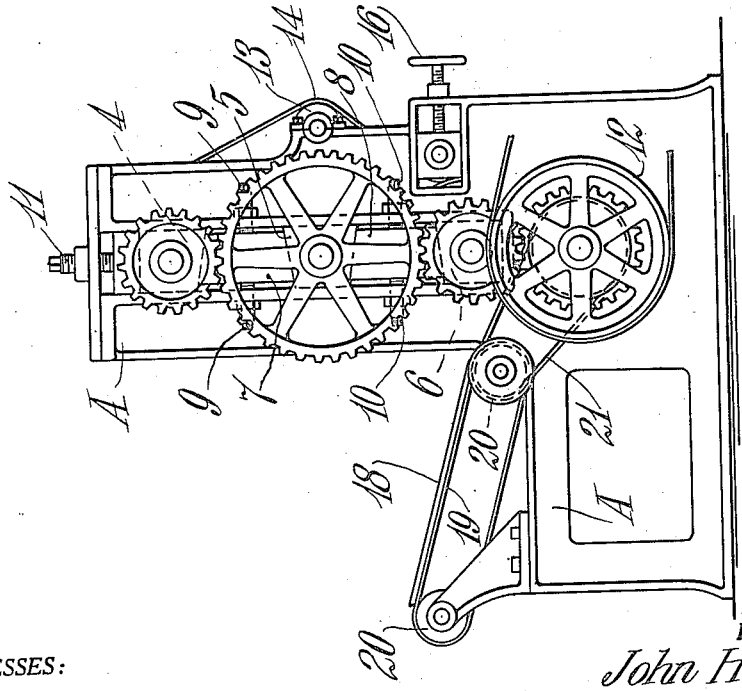
WITNESSES:
INVENTOR.
John Hanna.
BY
ATTORNEYS.

UNITED STATES PATENT OFFICE.

JOHN HANNA, OF CHICOPEE FALLS, MASSACHUSETTS, ASSIGNOR TO FISK RUBBER COMPANY, OF CHICOPEE FALLS, MASSACHUSETTS, A CORPORATION OF MASSACHUSETTS.

MACHINE FOR FORMING AND JOINING SHEETS OF RUBBER AND THE LIKE.

1,289,744. Specification of Letters Patent. Patented Dec. 31, 1918.

Application filed December 10, 1915. Serial No. 66,084.

*To all whom it may concern:*

Be it known that I, JOHN HANNA, a citizen of the United States of America, and residing in Chicopee Falls, in the county of Hampden and State of Massachusetts, have invented certain new and useful Improvements in Machines for Forming and Joining Sheets of Rubber and the like, of which the following is a specification.

This invention relates to apparatus for forming multi-ply sheets of rubber and is especially designed for producing rubber strips for use in the manufacture of tires.

In the formation of sheets of rubber, heretofore, the rubber stock has been drawn out between a pair of pressure rolls to the desired thickness in a single operation. Where, however, as in tire manufacture, relatively thick sheets of rubber are used, this process is not wholly satisfactory on account of its tendency to form blisters in the rubber. The presence of blisters in rubber strips used in tires is particularly undesirable yet, with the process formerly used of forming the desired thickness of the strips in one ply, these objectionable imperfections commonly appear.

An object of this invention is to provide improved apparatus for forming sheets of rubber wherein a plurality of sheets are drawn out which are sufficiently thin to avoid blistering, and these several sheets are thereafter superimposed to form a multi-ply sheet of the desired thickness in an improved manner and with useful results.

Another object of the invention is to provide an apparatus for the formation of a multi-ply sheet of rubber, which comprises a series of pressure rolls, stacked one above another in contiguous relation and arranged so that alternate rolls revolve at different speeds, wherein banks of rubber stock may be placed into the bight of each set of contiguous rolls and be rolled out into relatively thin sheets, together with guiding devices to bring all the sheets so formed one above another to form a single multi-ply sheet of the desired thickness in an improved manner as will appear.

Referring to the drawings, as illustrating one preferred manner in which the invention may be applied in practice—

Figure 1 is a side elevational view of the apparatus, and

Fig. 2 is a sectional elevation thereof.

Referring to the drawings in detail, A and A' represent spaced supporting side frames for the apparatus and mounted therein are a series of pressure rolls 1, 2, and 3, which are stacked one above the other in contiguous relation. The rolls 1, 2, and 3 are rotatably mounted in suitable boxes 4, 5, and 6, respectively, which are slidable in the frame, and between the boxes 4 and 5 and the boxes 5 and 6 are wedges 7 and 8, which are movable by adjusting screws 9 and 10, respectively. The latter and the wedges 7 and 8, together with an adjusting screw 11 at the top of the frame, permit vertical adjustment of the rolls 1, 2, and 3 in an obvious and well known manner. Any other suitable means may be employed for this purpose, and the particular means just described is chosen solely for the purposes of illustration. The rolls 1, 2, and 3 are connected by intermeshing gears, as shown in Fig. 1, and this gear train may be driven by any suitable means such as the pulley 12 (see Fig. 1). It is to be noted that the gear on roll 2 is of larger diameter than the gears on either of rolls 1 and 3 and, in consequence, the latter are driven at higher speed than the intermediate roll 2.

Rotatably mounted adjacent to and spaced from the roll 2 is an idler roll 13 which is arranged to guide a sheet 14, formed between the rolls 1 and 2 in a manner to be described, downwardly toward the lower pressure roll 3. Coacting with the latter is a small roll 15, which is horizontally movable by the hand wheel 16. This roll serves to press the sheet 14 against a sheet 17 formed between the rolls 2 and 3, whereby the two sheets are forced together to form a single two-ply sheet 18. Adjacent the lower pressure roll 3 and on the delivery side thereof is a conveyer 19 mounted on spaced rolls 20 which may be driven in any suitable manner as, for example, by the belt 21 in the manner clearly shown in Fig. 1. The conveyer 19 is not an essential part of the apparatus but is usually employed in practice to carry the sheet 18 to a desired point for further handling.

In operation, rubber stock is thrown into the bight between the rolls 1 and 2 and into that between the rolls 2 and 3 to form "banks" which are indicated conventionally in Fig. 2 at 22 and 23, respectively. As the pressure rolls rotate in the direction of the arrows shown in Fig. 2, rubber is taken from the banks 22 and 23 and drawn out into relatively thin sheets 14 and 17 by the fast traveling rolls 1 and 3. The lower sheet 17 is then guided by the operator around the lower roll 3 and upon the conveyer 19 and subsequently the upper sheet 14 is carried partially around the roll 1, over roll 13, and then passed between the sheet 17 on the roll 3 and the adjustable roll 15. The latter is subjected to sufficient pressure by the hand wheels 16 to force the two sheets 14 and 17 into intimate contact to form the single two ply sheet 18. The latter, since it is built up of two or more sheets, which are relatively thin and not readily blistered, is free from the usual imperfections encountered in drawing out relatively thick sheets in a single ply. Obviously, if desired, sheets having three or more plies may readily be formed with the apparatus described as it is simply necessary to provide an additional pressure roll for each additional ply.

Thus, an improved apparatus has been provided for forming multi-ply sheets of rubber which is particularly characterized by the formation of relatively thick sheets, by a minimum number of rolls, without objectionable blisters and like imperfections.

It is recognized that modifications may be made in the structure herein described for illustrative purposes without departing from the scope of the invention which is defined by the appended claims rather than the foregoing description.

What I claim is—

1. Apparatus for forming multi-ply webs of rubber and the like, comprising in combination, a series of calender rolls stacked one above another in contiguous relation, each contiguous pair of said rolls arranged to produce therebetween a web of material and a pressure roll mounted to coöperate with one of the calender rolls and join the several webs into a single multi-ply web.

2. Apparatus for forming multi-ply sheets of rubber and the like comprising, in combination, a series of calender rolls stacked one above another in contiguous relation, each contiguous pair of rolls arranged to produce therebetween a web of material, guiding means to direct the several webs to one of said calendar rolls and a pressure roll mounted to coöperate with the last-named roll to unite the several webs into a single multi-ply web.

3. Apparatus for forming multi-ply webs of rubber and the like, comprising, in combination, upper, intermediate and lower calender rolls stacked one above another in contiguous relation, the upper and lower rolls arranged by engagement with the intermediate roll to produce separate webs of material, guiding means to direct one web upon the other in superposed relation, and an adjustable pressure roll mounted to coöperate with one of said calender rolls to unite the webs into a single two ply web.

JOHN HANNA.